May 18, 1965 K. E. BUCKMAN 3,184,063
LIQUID FILTER
Filed June 7, 1962 2 Sheets-Sheet 1
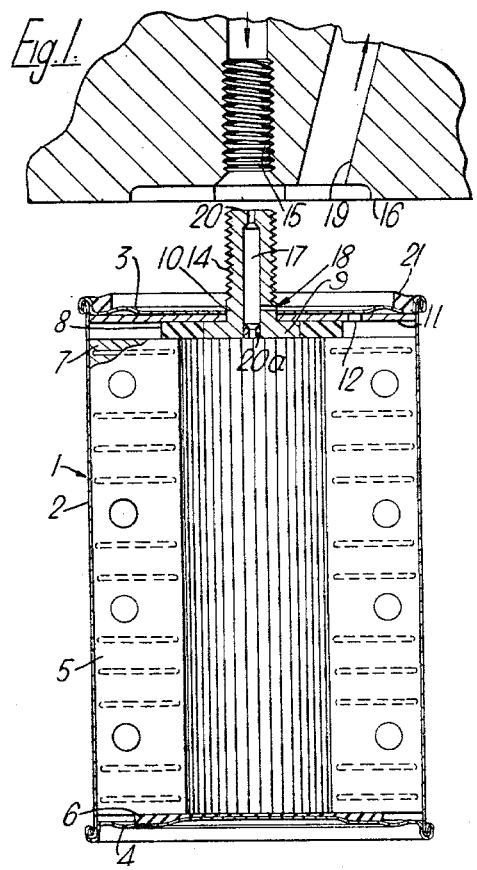
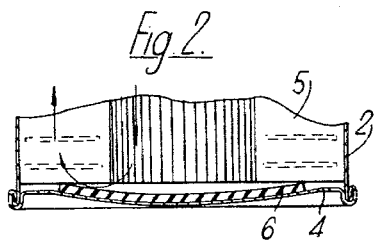
Inventor
*Kenneth Ernest Buckman*
BY
*B. E. Johnson*
Attorney

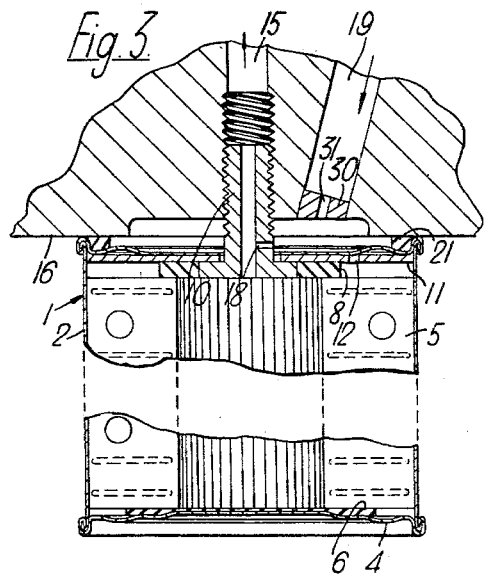
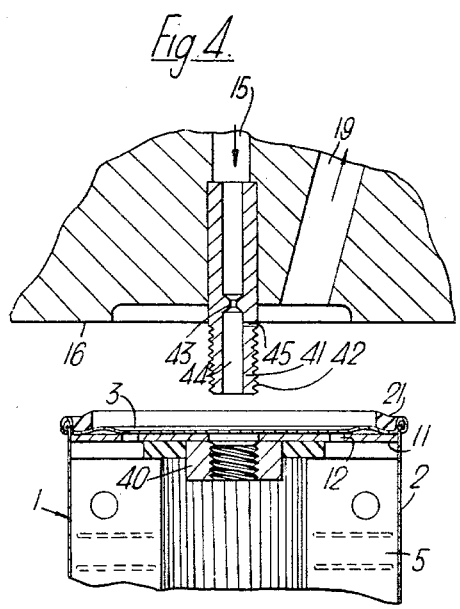

United States Patent Office 3,184,063
Patented May 18, 1965

3,184,063
LIQUID FILTER
Kenneth Ernest Buckman, Winsor, near Woodlands, England, assignor to General Motors Corporation, Detroit, Mich., a corporation of Delaware
Filed June 7, 1962, Ser. No. 200,864
Claims priority, application Great Britain, June 9, 1961, 20,864/61
2 Claims. (Cl. 210—130)

This invention relates to the filtration of liquids and in particular to the filtration of the lubricant in the lubrication circulation system of an internal combustion engine.

The object of the invention is a filter unit for the filtration of liquids.

In accordance with the invention a liquid filter unit comprises a filter element which is enclosed in a casing having an inlet and at least one outlet respectively in communication with opposite sides of the element, the casing having a yieldable end wall which under the action of a predetermined fluid pressure within the casing is distorted to permit fluid flow between the inlet and outlet so as to by-pass the filter element.

Preferably the casing is constructed as a conventional tin can, being formed of thin sheet metal with a tubular body portion with a longitudinal seamed joint, and end caps secured at their peripheries to the body portion by rolled seam joints; one end cap is preferably reinforced by a stiffener plate and carries a connector member which is adapted to be engaged with a complementary connector member on an engine mount-face so as to form a screwed spigot and socket joint therewith and to seal the end cap to the mount-face and place the liquid inlet and outlet openings on the end cap and mount-face members in communication with each other.

Preferably the connector member also provides, externally of the casing, a passage for liquid flow between the inlet and outlet on the mount-face to by-pass the filter unit; and at least one of the connector members includes one or more restrictor openings which ensure that the liquid pressure drop across the filter unit will be a predetermined fraction of the pressure of the liquid delivered to the unit.

The restrictor openings may be on either or both of the connector members; alternatively or additionally an inlet opening on the end cap member may constitute a restrictor.

The spigot and socket connection between the filter unit and the mount-face member may be formed by an externally threaded hollow spigot secured to the end cap of the casing, and a tapped bore in the mount-face member; or the spigot may be secured on the mount-face member and the socket formed by a nut or like internally threaded member secured to the end cap.

The filter element is preferably of pleated synthetic resin impregnated filter paper or like sheet filter material and in the form of an annular element having pleats which are individually sealed at each end.

The sheet filter material of which the element is made is preferably of the grade which is normally used for what are known as "full flow" filter elements, although the filter unit is intended to operate to provide what is known as "partial flow" filtration. Preferably the construction of the filter element and the restrictor openings are such that the pressure drop across the filter unit does not exceed 7 to 12 pounds per square inch when the pressure of the liquid delivered to the unit is 60 pounds per square inch and the filter element has become clogged with deposited particles. It is preferred that the pressure drop across the unit when the filter element is new shall be of the order of 2.25 pounds per square inch to 6 pounds per square inch, these values being based on the employment of a casing which will withstand an internal pressure of 10 to 12 pounds without distortion of the casing.

The scope of the invention is defined by the appended claims; and the invention and the method by which it is to be performed are hereinafter particularly described with reference to the accompanying drawings in which;

FIGURE 1 is a vertical section through a filter unit according to the invention and an engine mount-face to which the unit is to be secured;

FIGURE 2 is a detail section of the lower end of the element shown in FIGURE 1, in another condition of operation;

FIGURE 3 is a vertical section through a modified form of the filter unit shown in FIGURE 1 and of the mount face to which the unit is secured; and FIGURE 4 is a vertical section through the upper part of a further modification of the filter unit shown in FIGURE 1 and of the mount-face.

In one preferred embodiment of the invention shown in FIGURES 1 and 2 an internal combustion oil filter unit comprises a container or casing 1 formed as a conventional tin can and made from thin gauge sheet metal with a longitudinal rolled seam on a cylindrical body portion 2 and end caps 3, 4, also of sheet metal, which are roll-seamed at their respective peripheries to opposite ends of the body portion 2.

Within the casing 1, and preferably made as a sliding fit therein is an annular pleated paper filter element one end of which abuts against a resilient gasket 6 on the end plate 4, the gasket 6 preferably being square in shape and sealing the central opening at one end of the annular filter element 5. The ends of each pleat of the filter element 5 are individually sealed, as by adhesive 7 applied to the opposed end portions of the two parts of each pleat.

The other end of the filter element 5 abuts against an annular gasket 8 which fits around a flange 9 at one end of a connector member 10 in the form of a flanged hollow spigot which extends through, and is welded by its flange 9 to, a stiffener plate 11 which is in turn secured, as by welding, to the end plate 3 of the casing 1. As shown, the end plate 3 is preferably of annular form.

The stiffener plate 11 has therein one or more unrestricted outlet openings 12 providing communication between the exterior of the casing and the space between the exterior of the filter element, that is, the spaces between the adjacent pleats of the element, and the interior of the casing 1. The connector member 10 is mounted coaxially of the end plate 3 and stiffener plate 11, and the spigot portion thereof extending from the casing 1 is externally threaded at 14 so that it can be screwed onto a complementary connector member comprising a corresponding tapped bore 15 in an engine mount-face 16 to which the filter unit is to be secured.

The connector member 10 has an axial inlet passage 17 extending therethrough, and externally of the casing 1 the connector member 10 also has a transverse bleed passage 18 which is in communication with the inlet passage 17, said bleed passage 18 being in communication, when the filter unit 1 is secured to the mount-face 16, with an outlet opening 19 in the mount-face 16, the outlet opening 19 also being in communication with the outlet openings 12 on the stiffener plate 11 when the unit 1 is thus secured. The inlet passage 17 and the transverse bleed passage 18 are constructed so as to provide a desired pressure drop in liquid which passes from the opening 15 on the mount-face 16 to the interior of the filter element 5 by way of the connector member 10, so that only a proportion of the liquid coming from the passage 15 on the mount-face 16 passes through the filter element 5 and then to outlet opening 19, the remaining proportion of the liquid passing direct by way of the bleed passage 18 in the connector member 10 to the outlet opening 19 in the mount-face.

The desired pressure drop to obtain the above stated result is conveniently obtained by forming the inlet passage 17 with a restrictor opening 20 at its end. If required, an additional restrictor 20a may be provided at the other end of the passage 17. In this way the connector member may be formed with a standard size axial inlet passage, and the restrictor opening 20 and a restrictor 20a may be made of a size to obtain the characteristics required for a particular installation. In the embodiment illustrated the restrictor opening 20 may be .046" in diameter and the bleed passage 18 may be .081 in diameter.

An annular resilient gasket 21 of rubber or like material is located within the rolled over rim of the end plate 3 and is compressed between the mount-face 16 and the end plate 3 and stiffener plate 11 when the filter unit 1 is secured to the mount-face 16, so as to provide a sealed joint between the periphery of the end cap 3 and the mount-face 16.

In use, the filter unit 1 is secured to the engine mount-face 16 by screwing the connector member 10 into the tapped bore 15, the latter being in communication with the outlet side of the engine lubrication circulation system and the annular gasket 21 being compressed so as to form a seal between the mount-face 16 and the unit 1 when the rim of the end cap 3 abuts the mount-face 16.

Lubricant coming from the passage 15 in the mount-face passes through the restricted inlet 20 in the spigot 10 to the interior of the annular pleated filter element 5 and then from the exterior of the element 5, by way of the longitudinal passages between the pleats of the element through the unrestricted outlet openings 12 in the stiffener plate 11 and from thence to the opening 19 in the mount-face 16 and from there to the engine lubricant sump.

It will be understood that the flow of lubricant which passes through the filter element 5 is a portion only of the total flow of lubricant delivered through the passage 15, the remainder of the lubricant passing through the bleed passage 18 direct to the passage 19 on the mount-face 16.

When the solid particles deposited within the filter element 5 have accumulated to such an extent that passage of the lubricant through the element is substantially blocked, then substantially all the lubricant will flow from the passage 15 and through the bleed passage 18 in the connector member 10 to the opening 19 in the mount-face; if, however, the bleed opening 18 becomes blocked, then the pressure within the thin sheet metal casing 2 will increase and the end plate 4 will be outwardly bowed to provide sufficient clearance, as shown in FIGURE 2, between one end of the filter element 5 and the gasket 6 to permit a flow of liquid through the passage 17 in the connector member 10, through the central passage of the annular filter element, between the end of the element and the gasket 6, between the spaces on the outside of the element between adjacent pleats thereof, and then by way of the openings 12 in the stiffener plate 11 to the passage 19 in the mount-face 16, this flow of liquid effectively by-passing the filter element 5.

In the embodiment shown in FIGURE 3 the direction of flow of the liquid through the filter element 5 is from outside to inside and the direction of flow of the liquid through the passages 15 and 19 in the mount-face is accordingly reversed as compared with that in FIGURES 1 and 2. In this embodiment, in order to provide the necessary pressure drop so as to control the pressure of the liquid within the filter unit 1, the connector member 10 is formed with a uniform bore axial passage 17 but a restrictor member in the form of a plug 30 with a restricted opening 31 therein is inserted in the passage 19 through which liquid is delivered to the filter unit 1.

The operation of the filter unit is otherwise the same as that described with reference to FIGURES 1 and 2, the passages 17 and 18 permitting flow of liquid between the passages 15 and 19 when the filter element is clogged, and the end plate 4 bowing outwardly to permit a by-pass flow of liquid around the filter element 5 in the event that the bleed passage 18 becomes clogged.

FIGURE 4 shows another embodiment of the invention in which the filter unit 1 is basically similar in construction to that shown in FIGURES 1 and 2 but is made so as to be a "screw-on" rather than a "screw-in" unit. In this embodiment the filter unit carries a connector member in the form of an internally threaded collar 40 secured, as by welding, coaxially with the stiffener plate 11; and there is secured in the passage 15 in the engine mount-face a complementary connector member in the form of a hollow spigot 41 which is externally threaded at 42 so that the collar 40 can be screwed thereon to secure the filter unit in sealed contact with the mount-face 16. In this embodiment the necessary restriction of the flow of fluid is obtained by providing a restricted bore 43 in the axial bore 44 of the spigot 41; and a lateral bleed passage 45 communicating with the bore 44 permits, as in the other embodiments described, flow of liquid between the passages 15 and 19 when the filter element has become clogged. The base of the casing 2 (not shown) will, as in the embodiments already described bow outwardly to permit liquid flow to by-pass the filter element if the bleed passage 45 becomes blocked and the element is clogged.

It will be understood from the foregoing description that a filter system employing a filter unit according to the invention employs the principle of "partial flow" filtration, that is, a portion only of the total quantity of liquid to be filtered is delivered to the filter unit; but instead of employing a relatively high pressure drop across the filter, for example of the order of 40 pounds per square inch when the pressure of liquid delivered to the filter unit is 60 pounds per square inch, the filter system according to the invention employs a pressure drop across the filter which is a relatively low fraction of the pressure of the liquid delivered to the filter, for example only a maximum of approximately 12 pounds per square inch when the liquid pressure at the outlet on the mount-face is 60 pounds per square inch. In the filter system according to the invention the filter medium is preferably such that solid particles below a certain size, for example below 5 microns pass readily through the filter element which is, accordingly, less likely to acquire during the early part of its useful life a relatively impermeable bed of small size particles (which do not substantially impair the efficient operation of the engine) and the fact that these small particles are allowed to pass the filter element instead of being retained on it ensures that the filter bed which accumulates on the dirty side of the element is of a relatively open or porous nature and consequently presents substantially less resistance to liquid flow than would a relatively impermeable bed of fine particles. Accordingly, the flow rate of the liquid through the element is maintained sufficiently high, and for a sufficiently long period before blockage of the element, to enable a relatively small size element to be used to provide effective filtration from the liquid of particles of a harmful size.

Filtration elements which do not have the ends of the pleats individually sealed may also be employed, but in such cases, since the filter element will have at each end thereof an end cap by which all the ends of the pleats are jointly sealed, it is necessary to space the outer periphery of the filter element from the inner wall of the casing so as to permit the flow of liquid from the engine mount-face to the interior of the casing and through the filter element.

I claim:

1. A filter unit comprising a casing sealingly capped at one end by a first wall means and sealingly capped at the other end by a second wall means, a hollow cylindrical flow-through filter element coaxially disposed within said casing, said filter element bearing against said first wall means at one end and bearing against said second wall means at the other end, said first wall means having inlet and outlet ports which provide for the flow of fluid through the filter element, said second wall means including a resilient sheet metal portion, said resilient sheet metal portion including a resilient gasket bonded to the inner surface of said sheet metal portion and bearing against the end surface of said filter element whereby excessive fluid pressure caused by said filter element when substantially clogged and resisting the normal fluid flow through said filter element will cause said resilient sheet metal portion to yield and become partially disengaged from said mating filter element so as to allow incoming fluid to bypass said filter element and pass through said outlet port.

2. A filter unit comprising a casing sealingly capped at one end by a first wall means and sealingly capped at the other end by a second wall means, a hollow cylindrical flow-through filter element coaxially disposed within said casing, said filter element bearing against said first wall means at one end and bearing against said second wall means at the other end, said first wall means having inlet and outlet ports which provide for the flow of fluid through the filter element, said second wall means including a resilient sheet metal portion, said second wall means including said resilient sheet metal portion having its outer surface exposed to the atmosphere and having a resilient gasket bonded to its inner surface substantially equal in dimension and similar in configuration to said inner surface of said resilient sheet metal portion, and said resilient gasket sealingly engaged with substantially the innermost end surface area of said filter element whereby excessive fluid pressure caused by said filter element when substantially clogged and resisting the normal fluid flow through said filter element will cause said resilient sheet metal portion to yield and become partially disengaged from said mating filter element so as to allow incoming fluid to bypass said filter element and pass through said outlet port.

References Cited by the Examiner
UNITED STATES PATENTS

| | | | |
|---|---|---|---|
| 1,940,316 | 12/33 | McKinley. | |
| 2,562,361 | 7/51 | Kasten | 210—131 |
| 2,707,562 | 5/55 | Kasten | 210—130 |
| 2,769,548 | 11/56 | Tischer | 210—130 |
| 3,021,955 | 2/62 | Joyce | 210—132 |

FOREIGN PATENTS 293,745  4/29  Great Britain.

HARRY B. THORNTON, *Primary Examiner.*
HERBERT L. MARTIN, *Examiner.*